(12) United States Patent  
Justin

(10) Patent No.: US 6,616,113 B2
(45) Date of Patent: Sep. 9, 2003

(54) TOOL-LESS PEDESTAL FOR A COMPUTER SYSTEM

(75) Inventor: Jeffrey L. Justin, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/748,903

(22) Filed: Dec. 27, 2000

(65) Prior Publication Data

US 2002/0080568 A1 Jun. 27, 2002

(51) Int. Cl.$^7$ ............................................... A47B 91/00
(52) U.S. Cl. ................ 248/346.01; 248/918; 312/208.1
(58) Field of Search .................... 248/346.01, 918; 312/208.1, 208.3, 223.1, 223.2; 361/724

(56) References Cited

U.S. PATENT DOCUMENTS

| | | | | |
|---|---|---|---|---|
| 4,949,934 A | * | 8/1990 | Krenz et al. ................ 248/676 |
| 5,020,768 A | * | 6/1991 | Hardt et al. ................ 248/678 |
| D330,021 S | * | 10/1992 | Kline et al. ................ D14/114 |
| D338,882 S | * | 8/1993 | Reiter ........................ D14/114 |
| 5,263,668 A | * | 11/1993 | Reiter ........................ 248/346 |
| 5,388,792 A | * | 2/1995 | Hastings et al. ......... 248/188.1 |
| D383,728 S | * | 9/1997 | Yurkonis et al. .......... D14/100 |
| 5,688,030 A | * | 11/1997 | McAnally et al. ....... 312/223.2 |
| 5,796,585 A | * | 8/1998 | Sugiyama et al. .......... 361/735 |
| D442,967 S | * | 5/2001 | Goto .......................... D14/447 |
| 6,364,278 B1 | * | 4/2002 | Lin et al. .................... 248/676 |
| 6,460,817 B1 | * | 10/2002 | Bosson ....................... 248/317 |

* cited by examiner

Primary Examiner—Anita King
Assistant Examiner—Steven Marsh

(57) ABSTRACT

A tool-less pedestal for a computer system housing has a planar member having first and second sections. The first section is adapted to removably engage with a bottom of the computer system housing without requiring any tools, the second section extending from the first section beyond the bottom of the housing when the first section is engaged with the bottom of the housing for preventing the housing from tipping over. Edges of the first section slidably engage with corresponding slots in the bottom of the housing, there being two edges and two slots. The first section is adapted to removably engage with a bottom of the computer system housing without protruding into an interior of the housing, without interfering with feet provided on the bottom of the housing, and is adapted to snap over a longer side of the housing bottom when fully seated.

13 Claims, 3 Drawing Sheets

TOOL-LESS PEDESTAL FOR A COMPUTER SYSTEM

BACKGROUND OF THE INVENTION

1. Field of the Invention

The invention relates to the field of computer system enclosures, and in particular, to tower type enclosures.

2. Background Information

As is well understood in the art, computer systems are electrically powered devices and therefore the electrical components are enclosed in a housing to prevent against accidental shock, short-circuiting, contamination, etc. There are a number of housing types in use today. A so-called "tower" case or housing is one known style of housing which is widely used.

The tower case can conveniently be placed on any level surface, such as a desk of floor. However, tower cases are more prone to tipping over than other case designs due to a generally narrow base and higher center of gravity, should the case or the thing it is resting on, e.g., a table, be accidentally bumped into, for example. Because these tower cases are subject to tipping over, placement options may be disadvantageously limited.

To overcome this limitation, the bottom of the tower case may be made wider to provide more stability, however this has the disadvantage that more floor space, or table-top space, will be used by the housing footprint.

Another solution to the stability problem is to add stabilizing structures to the housing bottom. However, in the past, tower case stability reinforcement structure has required some type of fastener disadvantageously requiring use of a tool to put on and take off. These tool-using structures also may require inverting the housing to put on and remove the structure, which is also disadvantageous. They also may require some part to protrude into the housing, thereby disadvantageously impacting the use of the interior of the housing. Further, they may interfere with or require modification or removal of the housing feet.

Therefore, it would be advantageous to have a stabilizing structure for a tower case which does not require a tool to put on and take off, and which does not require inverting of the housing to put on and take off, thereby overcoming problems and limitations of the prior art.

It would further be advantageous to have a structure that could fit into a relatively small space, e.g., a 7 mm space, and not hang below the feet of the housing, thereby allowing the system housing to be moved around by sliding it on the four feet.

Further, it would be advantageous to have a structure that could be secured on the bottom of the system housing and not protrude into the inside of the system.

SUMMARY OF THE INVENTION

It is, therefore, a principle object of this invention to provide a method and apparatus for tool-less pedestal for a computer system housing.

It is another object of the invention to provide a method and apparatus that solves the above mentioned problems so that a stabilizing structure can be provided without requiring tools to put on and take off, without requiring inverting of the housing to put on and take off, that can fit into a relatively small space without interfering with the housing feet, and which can be secured to the housing without requiring any parts which protrude into the housing.

These and other objects of the present invention are accomplished by the method and apparatus disclosed herein.

According to an aspect of the invention, a tool-less pedestal for a computer system is provided.

According to an aspect of the invention, the tool-less pedestal is provided for seating at the base of a computer system housing to keep it from tipping over.

According to an aspect of the invention, the pedestal can be put on or taken off of the system without any tools.

According to an aspect of the invention, the pedestal fits into a very small space without any fasteners protruding into the inside of the system.

According to an aspect of the invention, the pedestal does not interfere with the feet that the system slides on.

According to an aspect of the invention, a housing arrangement includes a tower-shaped housing having a generally rectangular bottom, the bottom being provided with a plurality of slots extending essentially perpendicularly with respect to the longer sides of the rectangular bottom, and at least one pedestal formed as a planar member having first and second sections, the first section being adapted to removably engage with slots in the bottom of the computer system housing without requiring any tools, and the second section extending from the first section beyond the bottom of the housing when the first section is engaged with the bottom of the housing, whereby the at least one pedestal acts to prevent the tower-shaped housing from tipping over.

These and other aspects of the invention will become apparent from the detailed description set forth below.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1:
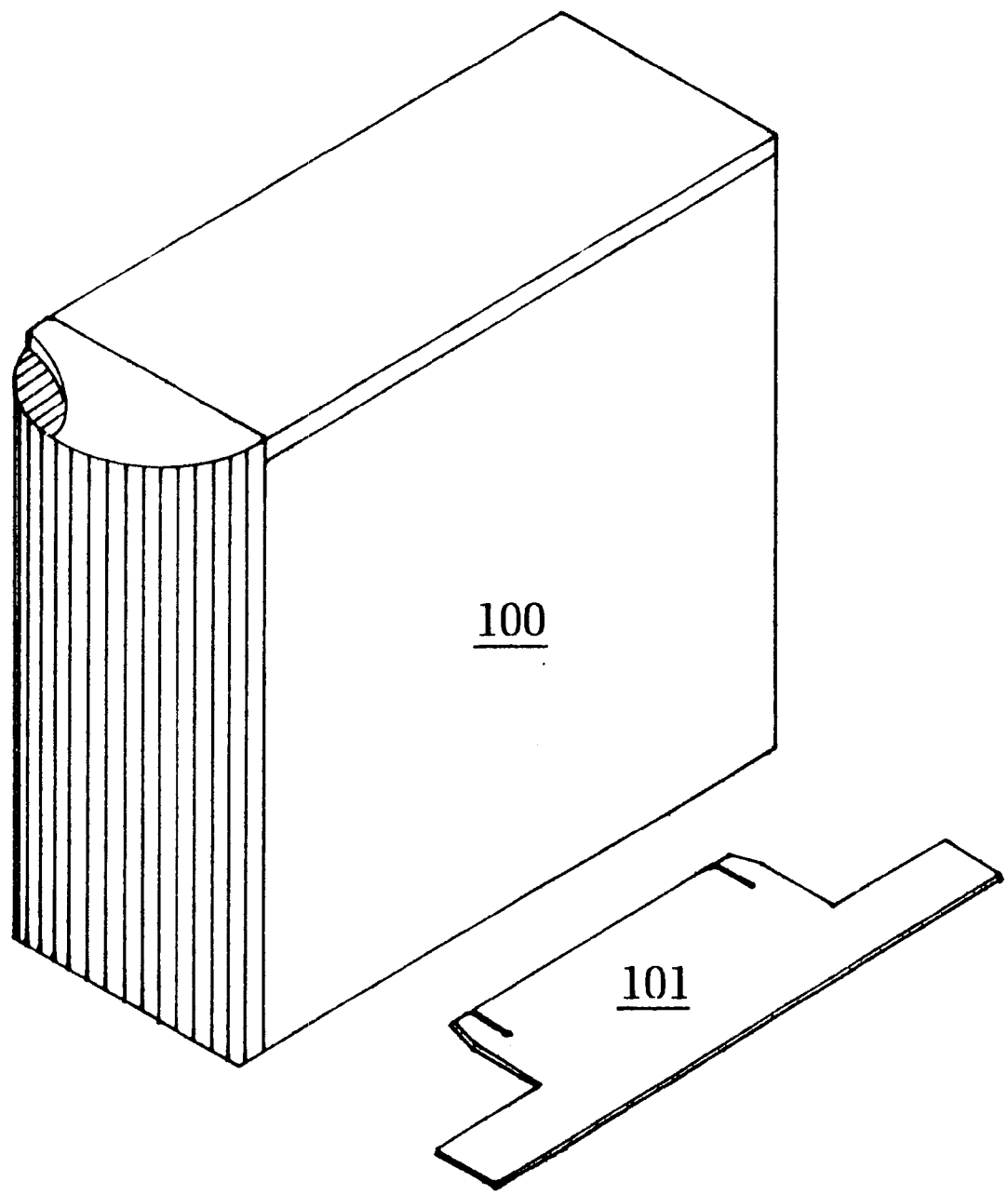
FIG. 1 illustrates a tool-less pedestal for a computer system separated from the computer housing according to an exemplary embodiment of the present invention.

A tool-less pedestal for a computer system according to the invention is shown as 101 in FIG. 1 separated from a computer housing 100. The computer system housing shown is a so-called "tower" case which can conveniently be placed on any level surface, such as a desk of floor. However, as mentioned in the Background section, such tower cases are more prone to tipping over than other case designs should it or the thing it is resting on, e.g., a table, be accidentally bumped into, due to a generally higher center of gravity. Because these tower cases are subject to tipping over, placement options may be limited.

The tool-less pedestal 101 according to the exemplary embodiment of the invention provides a at the base of the system housing 100 that keeps it from tipping over. The exemplary embodiment of a pedestal 101 can be put on or taken off of the system housing 100 without any tools. The exemplary pedestal 101 fits into a very small space without any fasteners protruding into the inside of the system housing 100 and does not interfere with the feet that the system slides on.

Therefore, the exemplary tool-less pedestal 101 according to the invention solves a number of problems with the prior art. For one, it provides a pedestal that can be put on and/or taken off without the need for any tools as will now be described in more detail with reference to FIGS. 1 and 2.

Figure 2:
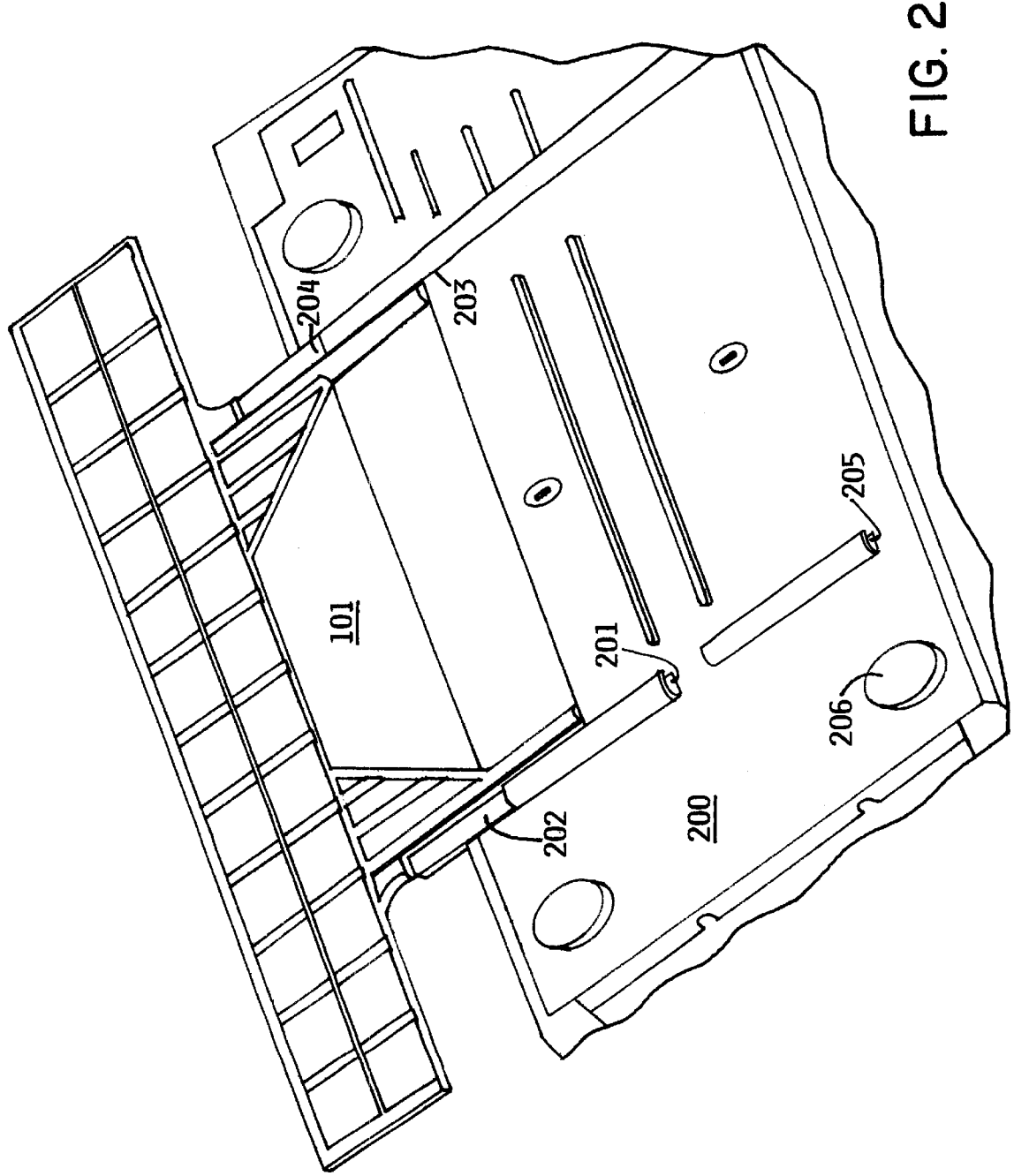
FIG. 2 illustrates a tool-less pedestal at the base of a housing for a computer system according to an exemplary embodiment of the invention.

FIG. 1 shows an exemplary embodiment of a pedestal 101 according to the invention, separated from a computer housing 100. FIG. 2 illustrates a bottom view of the computer system housing 100 with a tool-less pedestal 101 partially seated by way of side edges 202 and 204 which slide into slots 201 and 203 provided in the base 200 of the housing, and thereby can be securely seated without requiring any tools, according to an exemplary embodiment of the invention. That is, by way of sliding along the edges 202 and 204, the pedestal 101 can be put on and taken off of the housing bottom 200 without the need for any tools. The pedestal 101 provides a stabilizing for the housing 100. The pedestal 101 can be put on and taken off without requiring the inversion of the housing 100, since no tool or fasteners are required.

The pedestal 101 can advantageously fit into the small space between a supporting surface (e.g., a floor or table top) and the housing bottom 200, e.g., a 7 mm space, and not hang below the feet 206 on the bottom 200 of the computer system housing 100. The pedestal 101 fits into this small space allowing the computer system housing 100 to be moved around by sliding it on the feet 206. There are four of these feet 206 shown in FIG. 2 and this is typical for a tower type computer system housing. Edges 202 and 204 of the pedestal 101 and slots 201 and 203 serve to guide the pedestal into place on the bottom 200 of the housing.

The pedestal 101 can advantageously be secured on the bottom 200 of the system housing without protruding into the inside of the system. It can be seen from FIGS. 2 and 3 that the pedestal can be secured on the bottom of the housing without protruding into the inside of the housing, that is, there are no darts, snaps, or fasteners which protrude into the housing 100.

Figure 3:
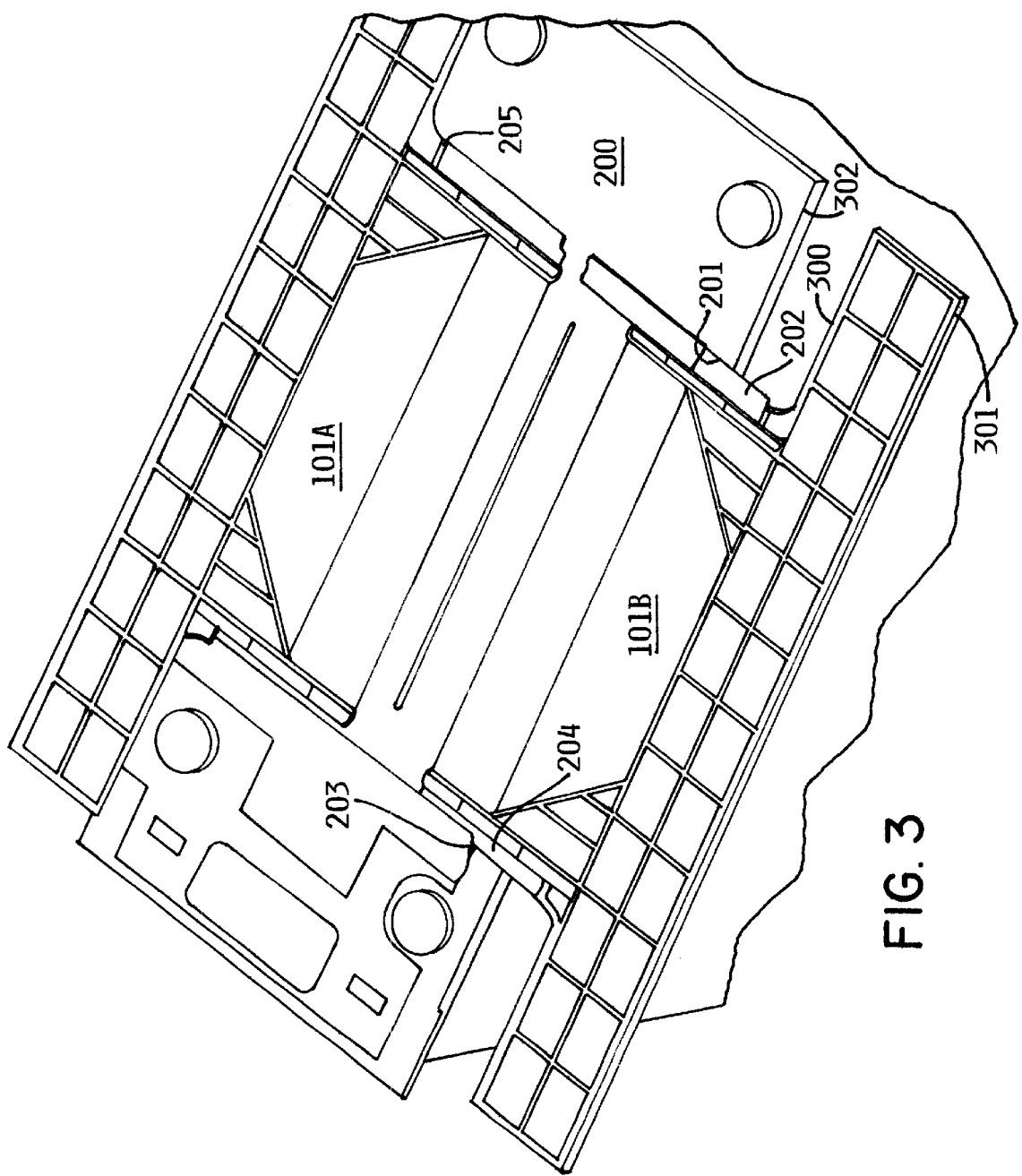
FIG. 3 illustrates a tool-less pedestal having two feet at the base of the computer system housing according to an exemplary embodiment of the invention.

FIG. 3 illustrates a tool-less pedestal having two pedestals at the base of the computer system housing according to an exemplary embodiment of the invention. Both pedestals 101A and 101B have the same general shape and design, and in fact, may be the same identical part. In that case, the pedestals are symmetrical such that the pedestal can be used on either side of the computer housing. Alternatively, but less advantageously, if the pedestals were made non-symmetrical, there could be a right and a left-sided version of the pedestals for use on the left and right sides of the computer housing respectively.

FIG. 3 shows two pedestals 101A and 101B on the computer system housing bottom 200. The pedestals have two sections which extend at right angles to each other to thereby form essentially a T-shaped planar member, one of the sections adapted to slidably engage with the slots on the housing bottom. The pedestal at the top of the figure, pedestal 101A, is fully seated into place in corresponding slots 203 and 205 in the bottom 200 of the computer housing. The pedestal shown towards the bottom of the FIG. 3, i.e., pedestal 101B, is partially seated into the slots 201 and 203 in the bottom 200 of the computer housing.

When fully seated, a rear edge 300 of the pedestal 101B snaps over the long coined area 302 of the computer housing that is parallel to the front edge 301 of the pedestal 101B creating a snug and secure fit.

As would be readily apparent to one skilled in the art, the pedestals 101 may be made of any suitable material, such as molded plastic or sheet metal, having adequate strength and flexibility to withstand the forces put on it without bending or breaking while preventing a typical computer housing from easily tipping over.

Although shown in a T-shaped design, the pedestals 101 could have other shapes within the spirit and scope of the invention.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A tool-less pedestal for a computer system housing, comprising:

a planar member having first and second sections, the first section being adapted to removably engage with a bottom of the computer system housing without requiring any tools, and the second section extending from the first section beyond the bottom of the housing when the first section is engaged with the bottom of the housing, wherein the first section is adapted to removably engage with a bottom of the computer system housing by having edges which slidably engage with corresponding slots in the bottom of the housing there being two edges and two slots; wherein the computer housing bottom is essential rectangular and is provided with the slots extending perpendicularly with respect to the longer sides thereof, from both of the longer sides of the housing bottom; and wherein the planar member is symmetrical so that the first section can be engaged with slots on either of the longer sides of the housing bottom;

wherein the first section is adapted to removably engage with a bottom of the computer system housing without protruding into an interior of the housing;

wherein the first section is adapted to removably engage with a bottom of the computer system housing without interfering with feet provided on the bottom of housing; and wherein an inner edge of the second section is adapted to snap over a longer side of the housing bottom when fully seated.

2. The tool-less pedestal for a computer system housing according to claim 1, wherein the first section and the second section extend at right angles with respect to each other, thereby forming a T-shaped planar member.

3. The tool-less pedestal for a computer system housing according to claim 2 wherein the planar member comprises plastic.

4. The tool-less pedestal for a computer system housing according to claim 2 wherein the planar member comprises metal.

5. A housing arrangement, comprising:
  a tower-shaped housing having a generally rectangular bottom, the bottom being provided with a plurality of slots extending essentially perpendicularly with respect to the longer sides of the rectangular bottom; and
  at least one pedestal comprising a planar member having first and second sections, the first section being adapted to removably engage with slots in the bottom of the computer system housing without requiring any tools, and the second section extending from the first section beyond the bottom of the housing when the first section is engaged with the bottom of the housing, wherein the first section is adapted to removably engage with slots in the bottom of the computer system housing by having edges which slidably engage with corresponding slots in the bottom of the computer system housing;
  whereby the ax least one pedestal acts to prevent the tower-shaped housing from tipping over;
  wherein an inner edge of the second section is adapted to snap over a longer side of the housing bottom when fully seated.

6. The housing arrangement according to claim 5, were pedestals, each engaged in respective slots so as to extend from a respective one of the longer sides of the rectangular bottom.

7. The housing arrangement according to claim 5, wherein the first section is adapted to removably engage with a bottom of the computer system housing without protruding into an interior of the housing.

8. The housing arrangement according to claim 5, wherein the first section is adapted to removably engage with a bottom of the computer system housing without interfering with feet provided on the bottom of the housing.

9. The housing arrangement according to claim 5, wherein the planar member is symmetrical so that the first section can be engaged with slots on either of the longer sides of the housing bottom.

10. The housing arrangement according to claim 5, wherein the planar member comprises plastic.

11. The housing arrangement according to claim 5, wherein the planar member comprises metal.

12. A method of stabilizing a computer housing comprising utilizing the housing arrangement according to claim 5.

13. A method of stabilizing a computer housing comprising utilizing the tool-less pedestal for a computer system housing according to claim 1.

* * * * *

UNITED STATES PATENT AND TRADEMARK OFFICE
CERTIFICATE OF CORRECTION

PATENT NO. : 6,616,113 B2
DATED : September 9, 2003
INVENTOR(S) : Jeffrey L. Justin It is certified that error appears in the above-identified patent and that said Letters Patent is hereby corrected as shown below:

<u>Title page,</u>
Item [74], please add -- *Attorney, Agent or Firm* – Christopher H. Lynt, Matthew J. Bussan, Leslie J. Payne --.

<u>Column 4,</u>
Line 48, "essential" should be -- essentially --.

<u>Column 5,</u>
Line 25, "ax" should be -- at --.

Signed and Sealed this

Sixteenth Day of December, 2003

JAMES E. ROGAN
*Director of the United States Patent and Trademark Office*